United States Patent [19]
Auner et al.

[11] Patent Number: 5,891,980
[45] Date of Patent: Apr. 6, 1999

[54] PHOTOLUMINESCENT POLYDISILACYCLOBUTANES

[75] Inventors: Norbert Auner, Berlin, Germany; Udo C. Pernisz, Midland, Mich.

[73] Assignee: Dow Corning Corporation, Midland, Mich.

[21] Appl. No.: 867,147

[22] Filed: Jun. 2, 1997

[51] Int. Cl.$^6$ ..................................................... C08G 77/20
[52] U.S. Cl. .............................. 528/32; 528/14; 526/279; 556/437
[58] Field of Search ........................ 528/32, 14; 526/279; 556/437

[56] References Cited

PUBLICATIONS

Journal of Organometallic Chemistry, vol. 336, pp. 59–81, (1987).
Z.anorg.allg. Chem., vol. 558, pp. 55–86, 87–106 (1988).
Journal of Organometallic Chemistry, vol. 363, pp. 7–23, (1989).
Journal of Organometallic Chemistry, vol. 393, pp. 33–56, (1990).
Angew. Chem. Int. Ed. Engl., vol. 30, No. 9, pp. 1151–1152, (1991).
Journal of the American Chemical Society, vol. 114, pp. 4910–4911, (1992).
Chem. Ber., vol. 126, pp. 575–580, (1993).
Chem. Ber., vol. 126, pp. 2177–2186, (1993).
J. prakt. Chem., vol. 337, pp. 79–92, (1995).
Journal of Organometallic Chemistry, vol. 377, pp. 175–195, (1989).

*Primary Examiner*—Melvyn I. Marquis
*Attorney, Agent, or Firm*—James L. De Cesare

[57] ABSTRACT

Photoluminescent polydisilacyclobutanes are made by reacting a dialkenyldihalosilane with an organolithium reagent in the presence of a solvent at 0–25° C. Optional reactants such as aromatic acetylenic hydrocarbons or bicyclic dienes may also be included.

10 Claims, No Drawings

PHOTOLUMINESCENT POLYDISILACYCLOBUTANES

BACKGROUND OF THE INVENTION

This invention is directed to polycarbosilanes, more particularly to polymers in which silicon atoms are linked through substituted alkylene bridges. Specifically, these substituted polysilalkylenes are polydisilacyclobutanes.

While the literature makes reference to processes using components similar to the components used according to our invention, we are not aware of any reference in the literature specific to the use of a halosilane containing two unsaturated radicals. Thus, according to the teachings in the literature, the halosilanes contain only a single unsaturated linkage. See for example, Z. anorg. allg. Chem., Volume 558, Pages 55–86, (1988); Chem. Ber., Volume 126, Pages 575–580, (1993); and J. prakt. Chem., Volume 337, Pages 79–92, (1995).

By using halosilanes containing two unsaturated linkages, as exemplified in *Journal of Organometallic Chemistry*, Volume 377, Pages 175–195, (1989), we are enabled to produce higher molecular weight materials, i.e., polymers.

BRIEF SUMMARY OF THE INVENTION

This invention relates to methods of making photoluminescent polydisilacyclobutanes and to polydisilacyclobutanes having structures such as

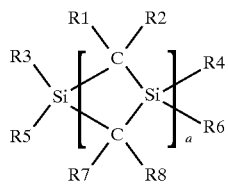

and

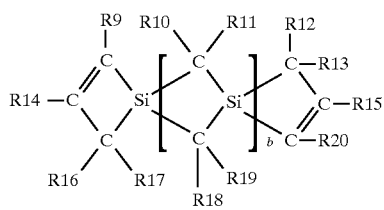

and

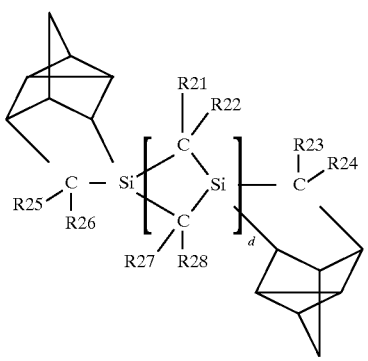

where a, b, d, and R1 to R28 are defined below.

These and other features and objects of our invention will become apparent from a consideration of the detailed description.

DETAILED DESCRIPTION OF THE INVENTION

This invention is directed to methods of preparing polymers having low to medium degrees of polymerization based on a disilacyclobutane building block. The basic reaction involves the use of divinyldichlorosilane and tert-butyllithium, and this basic route is modified by the addition of 2,5-norbornadiene or diphenylacetylene, in order to obtain the desired products.

Unexpectedly, it was found that phenyl-containing polymers exhibit strong photoluminescence in the blue region of the visible spectrum when excited by ultraviolet (UV) light with a wavelength of 337 nanometer (nm). Polymers terminated with chloro and vinyl groups show medium photoluminescence of the same blue color, whereas norbonyl terminated polymers show weak photoluminescence of the same blue color.

One type of polymer representative of our invention can be shown generically as:

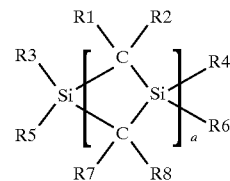

where a is an integer having a value of 2 to 20; R1, R2, R7, and R8 represent hydrogen or an alkyl radical containing 2 to 10 carbon atoms; and R3 to R6 represent halogen, alkoxy, or an unsaturated radical containing two or more carbon atoms.

One species (I) of the genus is shown below:

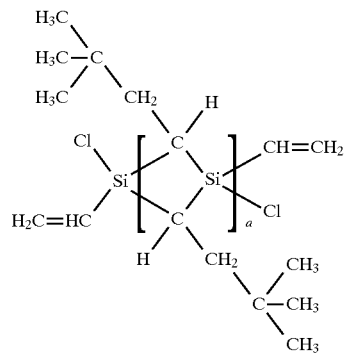

Particles of the above polymer where a=10 were irradiated with UV light at a wavelength of 337 nm generated by a pulsed nitrogen laser with 0.1 millijoule (mJ) per pulse. The photoluminescence was deep blue, medium strong, and well visible in ambient room illumination.

Another species (II) of the genus is shown below:

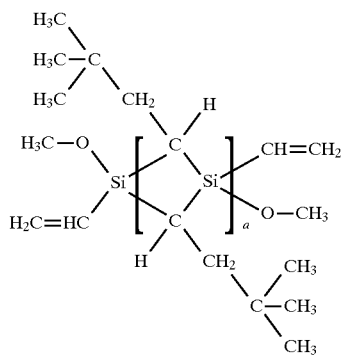

A compositional analysis of this polymer where a=about 10 showed that it consisted of 63.8 percent carbon, 12.7 percent hydrogen, and that the remainder was silicon and some oxygen from the methoxy groups. Gel Permeation Chromatography revealed that the molecular weight of the polymer was 1,690 dalton (number average) with a dispersity of 1.34. Analysis by $^{29}$Si Nuclear Magnetic Resonance showed that the chemical shifts were 6.4 and 2.9 ppm.

The process for making these types of polymers can be illustrated schematically as shown below:

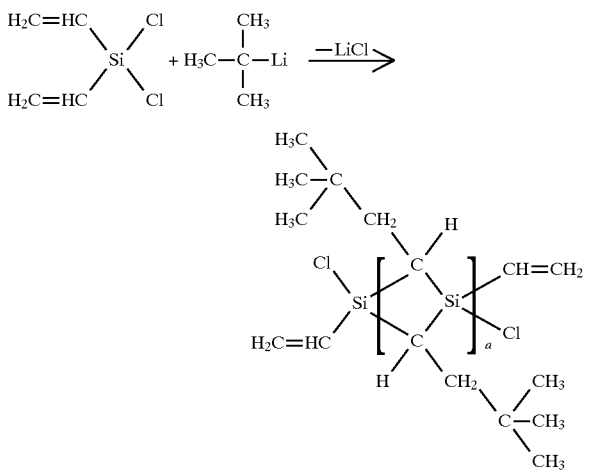

While divinyldichlorosilane is shown as the preferred dialkenyldihalosilane component, other unsaturated dihalosilanes can be used. Similarly, while tert-butyllithium is shown as the preferred organolithium reagent, other lithium alkyls or lithium aryls can be used, such as methyllithium, hexyllithium, or phenyllithium.

An example representing this process is set forth below in order to illustrate our invention in more detail.

EXAMPLE I

Into a container were combined stoichiometric amounts of divinyldichlorosilane and tert-butyllithium, in pentane as solvent, at 0° C. The reactants were heated to room temperature, i.e., 20°–25° C. After removing the solvent, a yellow solid resulted. The yellow solid was identified as species (I) shown above, where a had a value of 10. For purification, a portion of the sample of species (I) was extracted with methanol. Hydrochloric acid was generated, and trapped by the addition of a small quantity of diethylamine. As a result, chlorine groups in species (I) were replaced by methoxy groups, yielding species (II) shown above, where a had a value of 10.

Another type of polymer representative of our invention can be shown generically as:

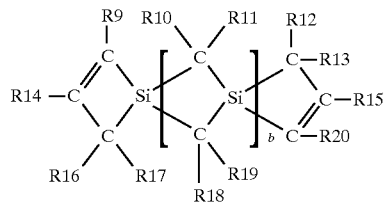

where b is an integer having a value of 2 to 20; R9, R14, R15, and R20 represent aryl radicals; R10 to R13 and R16 to R19 represent hydrogen or an alkyl radical containing 1 to 10 carbon atoms.

One species (III) of this genus is shown below:

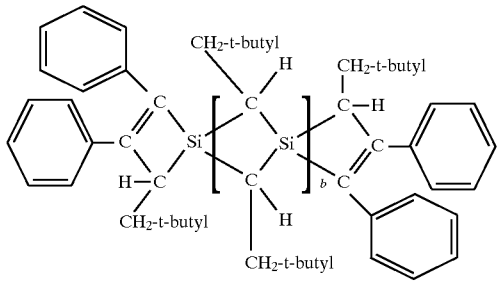

Particles of the above polymer where b=3 were irradiated with UV light at a wavelength of 337 nm generated by a pulsed nitrogen laser with 0.1 mJ per pulse. The photoluminescence was blueish white, very strong, and well visible in ambient room illumination.

A compositional analysis of this polymer where b=about 3 showed that it consisted of 73.6 percent carbon, 11.1 percent hydrogen, and that the remainder was silicon. Gel Permeation Chromatography revealed that the molecular weight of the polymer was 1,130 dalton (number average) with a dispersity of 1.48. Analysis by $^{29}$Si Nuclear Magnetic Resonance showed that the chemical shifts were 6.4 and 2.9 ppm.

The process for making this type of polymer can be illustrated schematically as shown below:

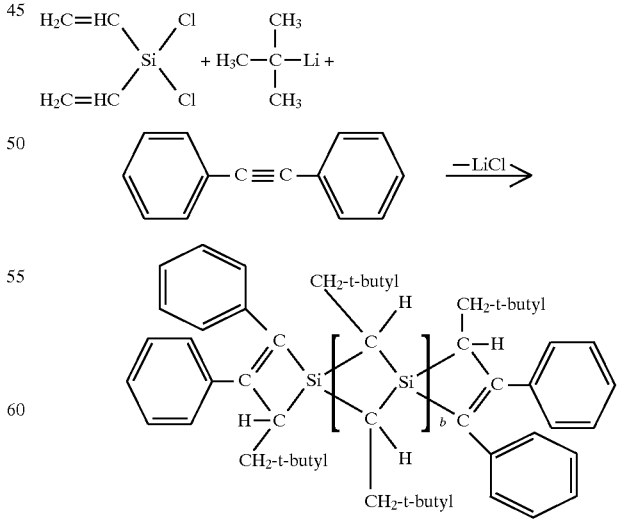

While diphenylacetylene is shown as the preferred additional component according to this process, other alkyl, aryl, aralkyl, alkaryl, or trialkylsilyl, substituted acetylenic hydrocarbons can be employed.

An example representing this process is set forth below in order to illustrate our invention in more detail.

EXAMPLE II

Example I was repeated at room temperature instead of 0° C., and diphenylacetylene was added as another component of the reaction mixture. Excess diphenylacetylene was removed by distillation. The resulting yellow oily residue was purified over silica gel in toluene. The yellow oily residue was purified by extraction with methanol, yielding a white powder species (III) shown above, where b had a value of ten.

Yet another type of polymer representative of our invention can be shown generically as:

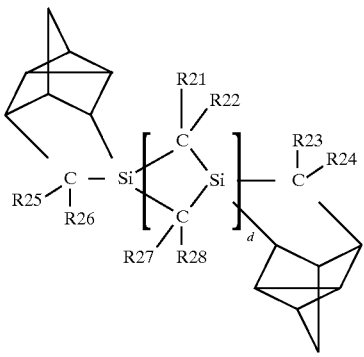

where d is an integer having a value of 2 to 5; and R21 to R28 represent hydrogen or an alkyl radical containing 2 to 10 carbon atoms.

One species (IV) of this genus is shown below:

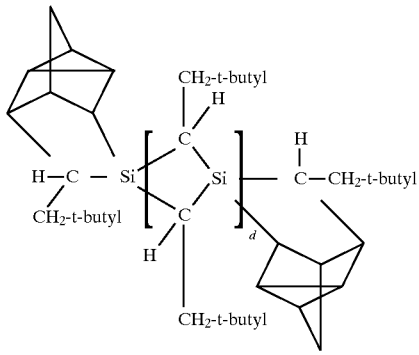

Particles of the above polymer where d=2 to 5 were irradiated with UV light at a wavelength of 337 nm generated by a pulsed nitrogen laser with 0.1 mJ per pulse. The photoluminescence was dark blue, weak, and visible in the dark.

The Diels-Alder type process for making such polymers can be illustrated schematically as shown below:

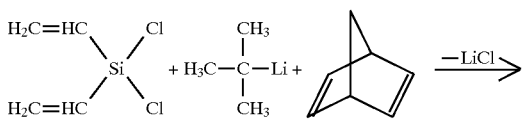

-continued

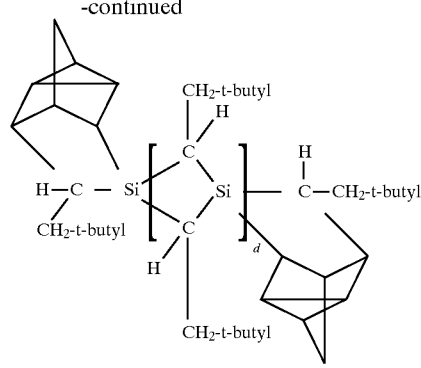

While 2,5-norbornadiene is shown as the preferred additional component according to this process, other bicyclic dienes can be employed.

An example representing this process is set forth below in order to illustrate our invention in more detail.

EXAMPLE III

Example II was repeated accompanied by slow stirring, and 2,5-norbornadiene was added as the additional component of the reaction mixture, instead of diphenylacetylene. Crystallization was used to isolate a crystal species (IV) shown above, where d had a value of about three.

Isolation of photoluminescent polydisilacyclobutanes can be carried out by extraction, crystallization, or precipitation by addition of alcohol.

Polymers prepared according to our invention are useful as passive or active display materials, and also in electroluminescent devices. In such utility, they can be incorporated into road signs and lane markers. The polymers also find application in various types of displays as luminescent coatings for improving their visibility.

Other variations may be made in compounds, compositions, and methods described herein without departing from the essential features of our invention. The forms of invention are exemplary only and not intended as limitations on their scope as defined in the appended claims.

We claim:

1. A photoluminescent polydisilacyclobutane having a formula selected from the group consisting of

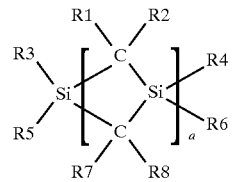

where a is an integer having a value of 2 to 20; R1, R2, R7, and R8 represent hydrogen or an alkyl radical containing 2 to 10 carbon atoms; and R3 to R6 represent halogen, alkoxy, or an unsaturated radical containing two or more carbon atoms;

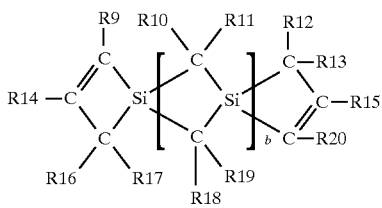

where b is an integer having a value of 2 to 20; R9, R14, R15, and R20 represent aryl radicals; R10 to R13 and R16 to R19 represent hydrogen or an alkyl radical containing 1 to 10 carbon atoms; and

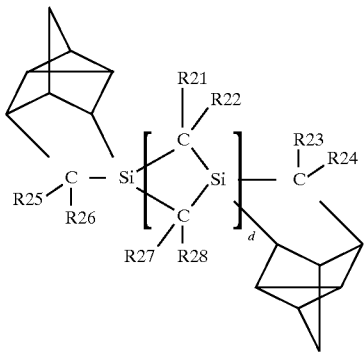

where d is an integer having a value of 2 to 5; and R21 to R28 represent hydrogen or an alkyl radical containing 2 to 10 carbon atoms.

2. Photoluminescent polydisilacyclobutanes according to claim 1 exhibiting photoluminescence in the blue region of the visible spectrum when excited by ultraviolet light.

3. A method of making photoluminescent polydisilacyclobutanes comprising reacting a dialkenyldihalosilane with an aromatic acetylenic hydrocarbon in the presence of an organolithium reagent and a solvent at a temperature of 0°–25° C.

4. A method according to claim 3 further including the step of isolating the photoluminescent polydisilacyclobutane by extraction, crystallization, or precipitation by addition of alcohol.

5. A method of making photoluminescent polydisilacyclobutanes comprising reacting a dialkenyldihalosilane with a bicyclic diene in the presence of an organolithium reagent and a solvent at a temperature of 0°–25° C.; stirring the reactants.

6. A method according to claim 5 further including the step of isolating the photoluminescent polydisilacyclobutane by extraction, crystallization, or precipitation by addition of alcohol.

7. Photoluminescent polydisilacyclobutanes made according the method defined in claim 3.

8. Photoluminescent polydisilacyclobutanes made according the method defined in claim 5.

9. Photoluminescent polydisilacyclobutanes made by a method comprising reacting a dialkenyldihalosilane with an organolithium reagent in the presence of a solvent at a temperature of 0°–25° C.

10. Photoluminescent polydisilacyclobutanes according to claim 9 in which the method includes the step of isolating the photoluminescent polydisilacyclobutane by extraction or crystallization.

* * * * *